(12) United States Patent
Baeuerle et al.

(10) Patent No.: US 9,587,555 B2
(45) Date of Patent: Mar. 7, 2017

(54) TRANSMISSION SYSTEM AND EXHAUST GAS TURBOCHARGER

(75) Inventors: Michael Baeuerle, Eberdingen (DE); Michael Nau, Dornhan/Aischfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1163 days.

(21) Appl. No.: 13/520,422

(22) PCT Filed: Dec. 6, 2010

(86) PCT No.: PCT/EP2010/068987
§ 371 (c)(1),
(2), (4) Date: Sep. 28, 2012

(87) PCT Pub. No.: WO2011/082917
PCT Pub. Date: Jul. 14, 2011

(65) Prior Publication Data
US 2013/0028714 A1 Jan. 31, 2013

(30) Foreign Application Priority Data
Jan. 5, 2010 (DE) .................. 10 2010 000 688

(51) Int. Cl.
*F02D 23/00* (2006.01)
*F02B 37/18* (2006.01)
(52) U.S. Cl.
CPC ........... *F02B 37/186* (2013.01); *Y02T 10/144* (2013.01); *Y10T 74/19884* (2015.01)
(58) Field of Classification Search
CPC ...... Y02T 10/144; F02B 37/18; F02B 37/183; F02B 37/186
(Continued)

(56) References Cited

U.S. PATENT DOCUMENTS 2,491,380 A 12/1949 Kutzler
4,838,226 A * 6/1989 Matsuzawa ............. F02D 11/04
123/361
(Continued)

FOREIGN PATENT DOCUMENTS

DE 102 45 193 4/2003
DE 10 2005 028372 12/2006
(Continued)

OTHER PUBLICATIONS

JP 2007002845 A English Translation.*

*Primary Examiner* — Thomas Denion
*Assistant Examiner* — Jessica Kebea
(74) *Attorney, Agent, or Firm* — Gerard Messina

(57) ABSTRACT

A transmission system for an adjusting device, of a waste gate of an exhaust gas turbocharger, including a four bar coupling mechanism, a driver arm operatively connected to a drive via a transmission, an output arm and a coupler, operatively connecting the driver and output arms, the transmission having a driving gear, assigned to the drive, and a driven gear, assigned to the driver arm and interacting with the driving gear having a rolling curve radius, which changes over the circumference, the driven gear having a rolling curve radius running complementary to the former. The rolling curve radii is selected in an angle of rotation range about the extended position of the coupling to form at least in regions a first transmission ratio and outside the angle of rotation range to form at least a second transmission ratio larger than the first ratio. Also described is an exhaust gas turbocharger.

8 Claims, 2 Drawing Sheets

(58) Field of Classification Search
USPC .......................................................... 74/437
See application file for complete search history.

(56) References Cited

U.S. PATENT DOCUMENTS

| | | | | |
|---|---|---|---|---|
| 6,974,119 | B2* | 12/2005 | Brendle .................. | F02D 11/10 123/399 |
| 7,032,877 | B2* | 4/2006 | von Willich ....... | F02M 25/0773 251/129.11 |
| 7,775,197 | B2* | 8/2010 | Hannewald ........ | F02M 25/0773 123/568.24 |
| 8,485,498 | B2* | 7/2013 | Takeda .................. | F02B 37/186 137/554 |
| 8,490,605 | B2* | 7/2013 | Gracner ................ | F02B 37/186 123/188.1 |
| 8,695,490 | B2* | 4/2014 | Harris .................. | A47J 43/1031 74/125.5 |
| 2004/0060349 | A1 | 4/2004 | Brendle et al. | |

FOREIGN PATENT DOCUMENTS

| | | | | |
|---|---|---|---|---|
| DE | 102008004688 A1 * | 7/2009 | ............ | F02B 37/186 |
| DE | 10 2008 014609 | 9/2009 | | |
| DE | 10 2009 051623 | 5/2011 | | |
| DE | 102010039791 A1 * | 3/2012 | ........... | F01D 17/105 |
| EP | 1450020 A2 * | 8/2004 | ............ | F01D 17/16 |
| EP | 1662120 A2 * | 5/2006 | ............ | F02B 37/186 |
| JP | 2007002845 A * | 1/2007 | | |
| WO | 03/029632 | 4/2003 | | |
| WO | 03/029679 | 4/2003 | | |

\* cited by examiner

TRANSMISSION SYSTEM AND EXHAUST GAS TURBOCHARGER

FIELD OF THE INVENTION

The present invention relates to a transmission system for an adjusting device, in particular, of a waste gate of an exhaust gas turbocharger, including a four bar coupling mechanism, which has a driver arm that is operatively connected to a drive via a transmission, an output arm and a coupler, which operatively connects the driver arm and the output arm; the transmission having a driving gear, assigned to the drive, and a driven gear, which is assigned to the driver arm and interacts with the driving gear. Furthermore, the present invention relates to an exhaust gas turbocharger.

BACKGROUND INFORMATION

Exhaust gas turbochargers equipped with a waste gate, which are adjustable by an adjusting device or an actuating drive, are known from the related art. The actuating drive can be configured, for example, as a pneumatic actuating drive. However, as an alternative, the actuation or adjustment of the waste gate can also be achieved by an electric actuating drive. In contrast to the pneumatic actuating drives, the electric actuating drives can provide significantly higher actuating forces. Typically long term values of up to about 250 N are achieved, which are necessary to optimize the tightness of the waste gate in its closed position. If the electric actuating drive is a rotary actuator, then the force is often transferred via a four bar coupling mechanism or via a four bar drive. The four bar coupling mechanism has the driver arm, the output arm and the coupler, by which the driver arm is operatively connected to the output arm. The driver arm can be operatively connected directly to the drive or via the transmission. In this context the transmission includes the driving gear and the driven gear, which interact with each other in order to transfer a torque from the drive to the driver arm. The driving gear is assigned to the drive; and the driven gear is assigned to the driver arm.

The four bar coupling mechanism is usually configured in such a way that when the waste gate is in the closed position, the driver arm is in the range of an extended position. However, it is also possible to position the driver arm at a distance from the extended position in the closed position of the waste gate, in order to be able to compensate for wear and drift phenomena during continuous operation of the four bar coupling mechanism, the adjusting device and/or the waste gate. In this context, the term "extended position" is defined as the position of the driver arm, in which an imaginary straight line between a drive bearing point (at which the driver arm is operatively connected to the drive) and a connecting point between the driver arm and the coupler is essentially in alignment with the coupler or an imaginary straight line between the connecting points of the coupler with the driver arm and an output arm that is, represents quasi an extension thereof. The angle of rotation position range, in which the driver arm is located when the waste gate is in the closed position, can also be called the wear range, because this range is provided, as described above, to compensate for wear or drift phenomena.

The closer the position of the driver arm to the extended position in the closed position of the waste gate, the smaller is the torque that has to be generated for holding the closed position at the drive bearing point or that has to be applied by the drive onto the driver arm. However, inversely this also means that the adjusting force, which can be applied to the coupler by the driver arm, increases as the driver arm approaches the extended position. This means that the adjusting force, which can be generated at the coupler, in the wear range—as a result of approaching the extended position—exceeds an adjusting force that is permissible to act on the coupler and is intended for the device to be adjusted—for example, the exhaust gas turbocharger. This may result in the device being damaged.

The related art includes, for example, DE 10 2009 051 623.9, DE 10 2005 028 372 A1 and DE 102 45 193 A1. German patent document DE 10 2009 051 623.9 discusses an actuating device that is provided for a valve flap, including a four bar mechanism, which has a first pivot arm, which can be rotated directly or indirectly by an actuator and at the free end of which a transfer element is supported in a rotationally movable manner. The transfer element actuates a second pivot arm, which adjusts the valve flap and which is also connected in a rotationally movable manner to the transfer element by way of its free end. For this purpose, an elastic arrangement are provided that apply a tensioning force on the closed valve flap, which is placed at a stop in this position, when the four bar mechanism is in an extended position, in which a longitudinal axis of the first pivot arm runs substantially parallel to the transfer element.

In this case the elastic arrangement are configured as a spring cup or spring accumulator. The arrangements are connected between the two parts of a two part transfer element. German patent document DE 10 2005 028 372 A1 relates to an actuator that is provided for an actuating element; and this actuator comprises an electric actuating motor, an adjusting shaft adjusting the actuating element, and a transmission, which is arranged between the actuating motor and the actuating shaft and has a transmission input stage with a first gear wheel, which can be driven by an actuating motor, and a second gear wheel that meshes with the first gear wheel. Each of the two gear wheels should have at least two tooth systems that are arranged axially side by side with a tooth offset and have the same pitch circle diameters. Similarly it is provided that one of the tooth systems on the first gear wheel meshes with one of the tooth systems on the second gear wheel.

Finally, DE 102 45 193 A1 relates to an actuating unit having an actuator housing. The actuating unit comprises a speed transforming gear having a pair of wheels, where an actuating motor-side wheel has between its first engagement end and its second engagement end a variable actuating motor-side rolling curve radius; and a throttle body-side wheel has between its first engagement end and its second engagement end a throttle body-side rolling curve radius that changes in a complementary manner relative to the actuating motor-side rolling curve radius.

SUMMARY OF THE INVENTION

The transmission system exhibiting the features described herein has the advantage of avoiding the overshooting of the permissible adjusting force of the device to be adjusted.

The exemplary embodiments and/or exemplary methods of the present invention may achieve this objective in that the driving gear has a rolling curve radius, which changes over the circumference, and the driven gear has a rolling curve radius that runs complementary to the former, the rolling curve radii being selected in an angle of rotation range about the extended position of the four bar coupling mechanism to form a first transmission ratio and outside the angle of rotation range to form at least one second transmission ratio that is larger than the first transmission ratio.

In this context a larger transmission ratio is understood to mean that the ratio of the torque, applied to the driven gear, to the torque, applied to the driving gear, is larger. Thus, the mechanism has a transmission ratio that changes over the angle of rotation position of the driving gear or the driven gear respectively.

The rolling curve radius of the driving gear and the rolling curve radius of the driven gear are matched in such a way that the driving gear and the driven gear interact in each position of the angle of rotation, in order to transfer the torque from the drive to the driver arm. If the driving gear and the driven gear are configured as gear wheels, then the rolling curve radii are to be chosen in such a way that the gear wheels engage with each other in any angle of rotation position. An appropriate choice of rolling curve radii ensures that the transmission ratio is smaller in the angle of rotation range about the extended position of the four bar coupling mechanism than outside the angle of rotation range. This achieves the objective that despite the constant torque of the drive the adjusting force acting on the coupler does not exceed the permissible adjusting force. Damage to the transmission system, the adjusting device and/or the exhaust gas turbocharger is thus avoided.

However, it is not necessary for the first transmission ratio to prevail over the entire range of the angle of rotation. Rather, it suffices to provide it only in a subrange of the range of the angle of rotation or to assign it to a specific position of the angle of rotation. It is advantageous for the first transmission ratio to be the smallest transmission ratio that is present between the driving gear and the driven gear. Additional transmission ratios in the range of the angle of rotation and outside the range of the angle of rotation are thus greater than the first transmission ratio.

A continuous change of the transmission ratio over the angle of rotation position may be provided. This means that the first transmission ratio obtains when the driving gear is in the angle of rotation position, in which the four bar coupling mechanism is in its extended position. Starting from the first transmission ratio, the transmission ratio rises continuously so that, for example, a linear increase or an increase that follows any other rule may be provided. The above-described embodiment of the transmission system offers the advantage that the actuating time of the adjusting device may be reduced, because the average transmission ratio decreases. This means that the drive only has to perform a smaller number of revolutions, in order to achieve the same actuating effect as in the case of the adjusting devices known from the related art—that is, for example, to move the waste gate of the exhaust gas turbocharger from its open position into its closed position. Similarly the device to be adjusted is protected, as already described above, against inadmissibly high adjusting forces.

A further embodiment of the present invention provides that the driving gear and the driven gear are configured as gear wheels. This ensures a reliable transfer of the torque from the drive to the driver arm. In this case the rolling curve radii of the gear wheels have to be matched in such a way that the engagement of the gear wheels is always guaranteed. It is advantageous for the rolling curve radii to be chosen in such a way that the rate of wear of the gear wheels is as low as possible. The gear wheels exist, for example, as spur gears and may exhibit an involute tooth gearing or Wildhaber-Novikov tooth gearing.

A further embodiment of the present invention provides that the rolling curve radii are selected in such a way that for each angle of rotation position of the driving gear and/or driven gear there is a specific transmission ratio and/or that at a specific drive torque, generated by the drive, a specific actuating torque may be achieved at the output arm. In this case the transmission ratio is determined by the rolling curve radii of the driving gear and the driven gear. Hence, when the rolling curve radii are properly chosen, each angle of rotation position may be assigned its associated defined transmission ratio. In this case it is advantageous to select, as already described above, a continuous variation of the transmission ratio, the smallest transmission ratio obtaining in the angle of rotation range, in which the four bar coupling mechanism is in its extended position. In so doing, the series of rolling curves may be chosen in such a way that the specific, in particular constant, drive torque achieves the specific, in particular constant, actuating torque at the driver arm.

A further embodiment of the present invention provides that the driving gear and/or the driven gear exhibits a rolling angle of less than or equal to 360°. The rolling angle is the angle that lies between the angle of rotation positions, which obtain, for example, in the open position or the closed position of the waste gate. Thus, the rolling angle is the difference between the end angle of rotation positions that may be assumed by the driving gear and the driven gear respectively. If the rolling angle is less than 360°, then the driving gear and the driven gear make operative contact with each other only over a subsection of their circumference.

A further embodiment of the present invention provides that the first transmission ratio is a minimum transmission ratio. This means that the rolling curve radii are selected in such a way that the first transmission ratio is the smallest transmission ratio. Therefore, starting from the first transmission ratio that obtains in the angle of rotation range about the extended position of the four bar coupling mechanism, only an increase or a constancy of the transmission ratio is provided.

A further embodiment of the present invention provides that outside the said angle of rotation range—that is, the angle of rotation range near the extended position—a third transmission ratio is provided, which is smaller than the second transmission ratio. Therefore, starting from the first transmission ratio, the transmission ratio increases up to the second transmission ratio. Then it is provided that the transmission ratio becomes smaller, until a third transmission ratio is reached that is smaller than the second transmission ratio. In this context, the second transmission ratio may be provided to be a maximum transmission ratio—that is, the largest ratio existing in the transmission. All of the specific embodiments of the transmission system provide that the third transmission ratio is smaller than the second, but larger than the first transmission ratio. However, as an alternative, it may also be provided that the third transmission ratio is smaller than the first transmission ratio. In principle, any profile of the transmission ratio between the first, the second and/or the third transmission ratio may be selected.

A further embodiment of the present invention provides that the driver arm is connected in a rotationally rigid manner to the driven gear and, in particular, is mounted with the driven gear in a common bearing. As a result, the driven gear of the transmission acts directly on the driver arm; no additional transmission between these two elements is provided. In such an embodiment of the transmission system it is especially advantageous if the driver arm and the driven gear are mounted in the common bearing.

A further embodiment of the present invention provides that the driver arm and the driven gear are configured as one piece. Consequently, in such an embodiment the two elements are integrally connected.

Furthermore, the exemplary embodiments and/or exemplary methods of the present invention relate to an exhaust gas turbocharger including a waste gate and an adjusting device for adjusting the waste gate, the adjusting device having a transmission system, in particular, according to the above embodiments, with a four bar coupling mechanism, the four bar coupling mechanism having a driver arm that is operatively connected to a drive by way of a transmission, an output arm and a coupler, which is operatively connected to the driver arm and the output arm, the transmission having a driving gear, assigned to the drive, and a driven gear, which is assigned to the driver arm and interacts with the driving gear. In this instance, it is provided that the driving gear has a rolling curve radius, which changes over the circumference, and the driven gear has a rolling curve radius that runs complementary to the former, the rolling curve radii being selected in an angle of rotation range about the extended position of the four bar coupling mechanism to form at least in regions a first transmission ratio and outside the angle of rotation range to form at least one second transmission ratio that is larger than the first transmission ratio. The transmission system may be further developed according to the above embodiments.

A further embodiment of the present invention provides that the drive is provided at a compressor housing of the exhaust gas turbocharger, and that the waste gate is provided at a turbine housing of the exhaust gas turbocharger. The drive is disposed at the compressor housing for thermal reasons. In contrast, the waste gate has to be mounted on the hot turbine side of the turbine housing. When the adjusting device is in operation, there is thus a load transfer between the compressor housing and the turbine housing of the exhaust gas turbocharger. The load transfer corresponds to the adjusting force transferred by way of the coupler of the four bar coupling mechanism.

When an exhaust gas turbocharger is used that is not configured according to the present invention, the situation may arise that the load transfer is inadmissibly high, so that the exhaust gas turbocharger may be damaged. This situation is avoided through a suitable choice of the rolling curve radii of the driving gear and the driven gear, because in this way the adjusting force, which is transferred by way of the coupler, and hence also the load transfer is limited to the permissible adjusting force.

The exemplary embodiments and/or exemplary methods of the present invention are explained in detail below with reference to the exemplary embodiments depicted in the drawings without thereby restricting the exemplary embodiments and/or exemplary methods of the present invention.

DETAILED DESCRIPTION

Figure 1:
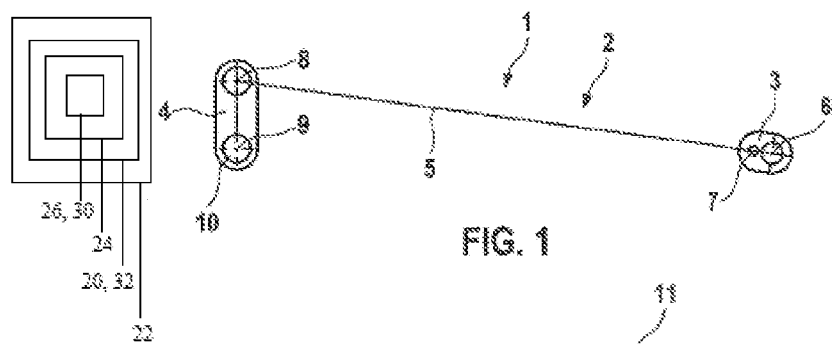
FIG. 1 shows a schematic drawing of a transmission system having a four bar coupling mechanism, a driver arm being in an extended position.

FIG. 1 is a schematic view of a transmission system 1 with a four bar coupling mechanism 2. Such a four bar coupling mechanism 2 is used, for example, for an adjusting device 24 of a waste gate 20 of an exhaust gas turbocharger 22. In this case the adjusting device 24 is an electrically operated adjusting device 24 and thus has an electric actuator or an electric drive 26. The four bar coupling mechanism 2 has a driver arm 3, an output arm 4 and a coupler 5 operatively connecting the driver arm 3 and the output arm 4. In this case the driver arm 3 is mounted so as to be rotatable about a bearing point 6. At this bearing point 6 the driver arm is operatively connected to a transmission 11 that is not shown here. Coupler 5 is mounted at a coupling bearing point 7 so as to be rotatable at the driver arm 2. The driver arm 4 has an additional coupling bearing point 8, at which the coupler 5 is mounted in a rotatable manner on the output arm 4. The output arm 4 is mounted in a rotatable manner about an output bearing point 9 and for this purpose may be attached to an output shaft 10. An operative connection between the output arm 4 and the waste gate 20 of the exhaust gas turbocharger 22 is produced by way of the output shaft 10. Hence, the transmission system 1 or the four bar coupling mechanism 2, which is shown here, is a component of the adjusting device 24 of the waste gate 20.

FIG. 1 shows the driver arm 3 in an angle of rotation position, in which the four bar coupling mechanism 2 is in its extended position. In this position an imaginary straight line between the bearing point 6 and the coupling bearing point 7 forms in essence an extension of an imaginary straight line between the coupling bearing points 7 and 8. In this instance, the output arm 4 is in an angle of rotation position, in which the waste gate of the exhaust gas turbocharger is in its closed position. Therefore, the illustrated angle of rotation position of the output arm 4 may also be called the closed position. If the output arm 4 is to be held in this angle of rotation position, then the illustrated extended position of the driver arm 3 is especially advantageous, because in this position the torque that is to be generated by a drive (not illustrated) is very small or equal to zero. Therefore, it is possible to hold the output arm 4 in the closed position with a very small amount of energy. FIG. 1 shows the four bar coupling mechanism 2 in its extended position, a position that is reached or set expediently only upon reaching the maximum wear and/or a maximum temperature drift. The four bar coupling mechanism 2 may be configured in such a way that when the output arm 4 is in the closed position, the extended position is not reached (yet), so that a reserve angle of rotation range is available for readjusting or for compensating for the wear, tolerances and/or temperature drift.

It is apparent from the drawing in FIG. 1 that a very large adjusting force may be applied to the coupler 5 in the range of the extended position via driver arm 3 by applying a comparatively small torque of the driver. However, it is necessary to limit the adjusting force, transferred by way of the coupler 5, to an admissible value, in particular, because the drive 26 is usually provided on a compressor housing 30 of the exhaust gas turbocharger 22 and the waste gate 20 is provided in a turbine housing 32 of the exhaust gas turbocharger 22.

Figure 2:
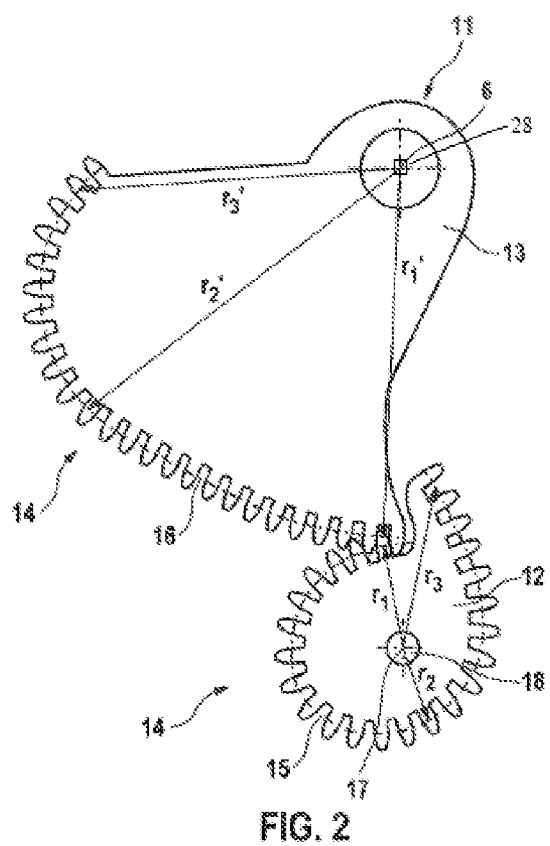
FIG. 2 shows a schematic view of a transmission of the transmission system assigned to the driver arm.

The aforesaid is achieved by connecting the driver arm 3 to the drive 26 by way of the transmission 11 shown in FIG. 2. The transmission has a driving gear 12 and a driven gear 13. Both of them are configured as gear wheels 14 and thus exhibit teeth. The driving gear 12 is assigned to the drive 26, while driven gear 13 is assigned to driver arm 3. Driver arm 3 is usually connected in a rotationally rigid manner to the driven gear 13. Ideally they are mounted in a common bearing 28 of the bearing point 6. The driving gear 12 interacts with the driven gear 13 in order to transfer the torque, provided by the drive 26, to the driver arm 3. For this purpose, the teeth of the driving gear 12 and the driven gear 13 mesh with each other. As shown in FIG. 2, both the driving gear 12 and the driven gear 13 have a rolling curve radius that changes over the circumference. For the driving gear 12 this is shown by a rolling curve 15, while for the driven gear 13 this is shown by a rolling curve 16. In the range, in which the teeth of the driving gear 12 and the driven gear 13 mesh with each other, the rolling curves 15 and 16 coincide with each other. It is also clear that the rolling curve radius of the driven gear 13 runs complementary to the rolling curve radius of the driving gear 12. This feature ensures that the teeth always mesh with each other. The driving gear 12 is connected to the drive 26 in a bearing point 17—for example, by attaching the driving gear 12 to a shaft 18 of the drive 26. In contrast, the driven gear 13 is mounted together with the driver arm 3 in the bearing point 6. The bearing point 6 and the bearing point 17 are stationary.

Figure 3:
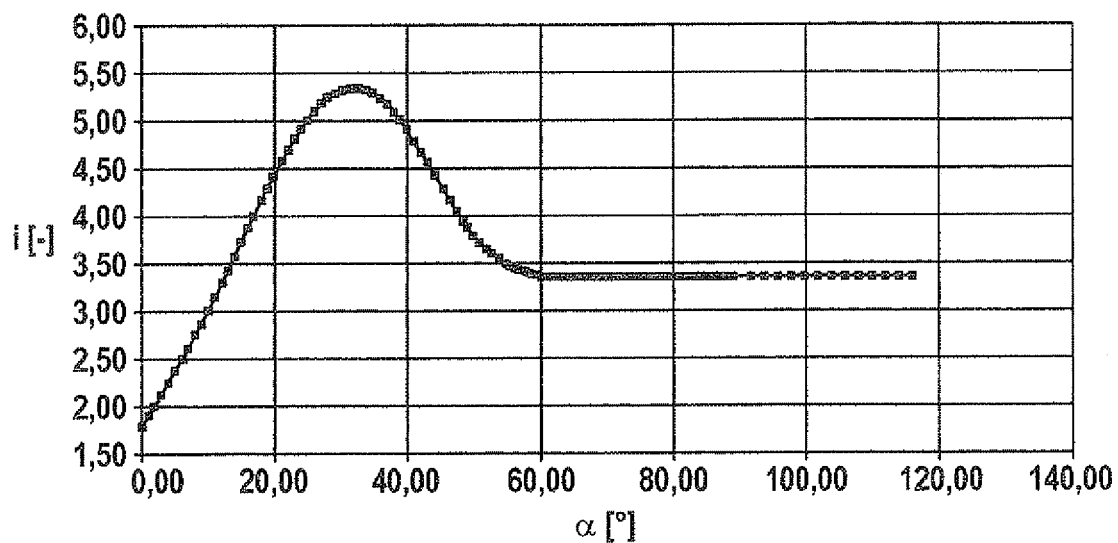
FIG. 3 shows a graph, in which a transmission ratio is plotted over an angle of rotation position of the driven gear.
Figure 4:
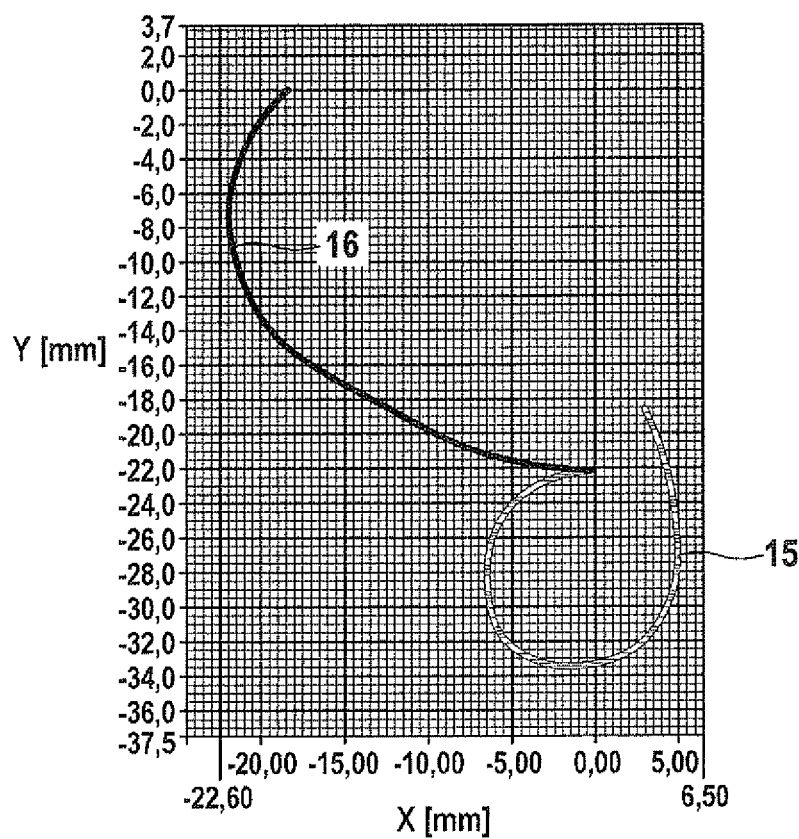
FIG. 4 shows a graph, in which rolling curves of the driver arm and an output arm of the transmission are plotted.

The operating mode of the transmission 11 is elucidated by FIGS. 3 and 4. These show in each case an additional specific embodiment of the transmission 11 in various positions of the angle of rotation. In FIG. 2 the driving gear 12 and the driven gear 13 are respectively in an angle of rotation position that corresponds to an open position of the waste gate or the adjusting device. This angle of rotation position represents a first end position of the angle of rotation. In this instance, the driver arm 3 (not illustrated) of the four bar coupling mechanism 2 is arranged at a distance from its extended position.

FIG. 2 shows the rolling curve radii $r_1$, $r_2$, and $r_3$ of the driving gear 12 and the rolling curve radii $r'_1$, $r'_2$, and $r'_3$, of the driven gear 13. In this way a defined transmission ratio of transmission 11 may be assigned to each angle of rotation position of the driving gear 12 and/or the driven gear 13. A third transmission ratio of transmission 11 lies in the range of radii $r_1$ and $r'_1$; a second transmission ratio lies in the range of radii $r_2$ and $r'_2$; and a first transmission ratio lies in the range of radii $r_3$ and $r'_3$. It is also easy to see that $r_1$ is larger than $r_2$, $r_2$ is smaller than $r_3$ and $r_3$ is larger than $r_1$. Similarly it is provided that $r'_1$ is smaller than $r'_2$, $r'_2$ is larger than $r'_3$ and $r'_3$ is smaller than $r'_1$. The result is that the third transmission ratio is smaller than the second transmission ratio, whereas the first transmission ratio is smaller than the third as well as the second transmission ratio. In FIG. 2 the driving gear 12 and the driven gear 13 occupy an angle of rotation position, in which the four bar coupling mechanism 2 deviates from its extended position. This means that the first transmission ratio is in an angle of rotation range about this extended position, whereas the second and the third transmission ratio are outside the range of the angle of rotation. This feature makes it possible to achieve that in the area of the extended position of the four bar coupling mechanism 2 the adjusting force, which is applied to the coupler 5, or the torque, which is introduced into the driver arm 3, is decreased.

This situation is shown in a graph in FIG. 3. In the graph the transmission ratio i of transmission 11 is plotted over the angle of rotation position α of the driven gear 13, which is given in degrees. In this context, an angle of rotation position of α=0° corresponds to the extended position of the four bar coupling mechanism 2. Thus, for the angle of rotation position α=0°, the first transmission ratio is set, which in this case is a minimum transmission ratio. Starting from the first transmission ratio, the transmission ratio increases as the angle of rotation position α grows, until at an angle of rotation position of about α=32°, the second transmission ratio is reached, which corresponds to the maximum transmission ratio of transmission 11. As the angle of rotation position α continues to increase, the transmission ratio drops again until the third transmission ratio is reached at about α=62°. Thereafter the transmission ratio remains constant at the value of the third transmission ratio even as the angle of rotation position continues to grow.

FIG. 4 shows a graph, in which the rolling curve 15 of the driving gear 12 and the rolling curve 16 of the driven gear 13 are shown once again. The graph shows a coordinate Y over a coordinate X, both of which are given in mm. At a point (0; 0) on the graph there is a point of rotation of the driven gear 13, that is, bearing point 6. A point of rotation of the driving gear 12, on the other hand, is located at (0; −28), which corresponds to bearing point 17.

What is claimed is:

1. A transmission system for an adjusting device of a waste gate of an exhaust gas turbocharger, comprising:
   a three-part linkage mechanism, which has a driver arm that is operatively connected to a drive via a transmission, an output arm and a coupler, which operatively connects the driver arm and the output arm;
   wherein the transmission has a driving gear, assigned to the drive, and a driven gear, which is assigned to the driver arm and interacts with the driving gear;
   wherein the driving gear has a rolling curve radius, which changes over the circumference, and the driven gear has a rolling curve radius that runs complementary to the former;
   wherein the rolling curve radii are selected in an angle of rotation range about the extended position of the three-part linkage mechanism to form at least in a first region a first transmission ratio and outside the angle of rotation range to form at least in a second region a second transmission ratio that is larger than the first transmission ratio; and
   wherein the driver arm is connected in a rotationally rigid manner to the driven gear and is mounted with the driven gear in a common bearing,
   wherein a third transmission ratio is provided outside the angle of rotation range in a third region such that the second region is situated between the first region and the third region, the third transmission ratio being smaller than the second transmission ratio.

2. The transmission system of claim 1, wherein the driving gear and the driven gear are gear wheels.

3. The transmission system of claim 1, wherein the rolling curve radii are selected so that for any angle of rotation position of at least one of the driving gear and the driven gear there is a defined transmission ratio of the transmission and/or for a defined drive torque, generated by the drive, a defined actuating torque is achievable at the output arm.

4. The transmission system of claim 1, wherein at least one of the driving gear and the driven gear exhibits a rolling angle of less than or equal to 360°.

5. The transmission system of claim 1, wherein the first transmission ratio is a minimum transmission ratio.

6. A transmission system for an adjusting device of a waste gate of an exhaust gas turbocharger, comprising:
   a three-part linkage mechanism, which has a driver arm that is operatively connected to a drive via a transmission, an output arm and a coupler, which operatively connects the driver arm and the output arm;
   wherein the transmission has a driving gear, assigned to the drive, and a driven gear, which is assigned to the driver arm and interacts with the driving gear;

wherein the driving gear has a rolling curve radius, which changes over the circumference, and the driven gear has a rolling curve radius that runs complementary to the former;

wherein the rolling curve radii are selected in an angle of rotation range about the extended position of the three-part linkage mechanism to form at least in a first region a first transmission ratio and outside the angle of rotation range to form at least in a second region a second transmission ratio that is larger than the first transmission ratio;

wherein the driver arm and the driven gear are one piece, and wherein a third transmission ratio is provided outside the angle of rotation range in a third region such that the second region is situated between the first region and the third region, the third transmission ratio being smaller than the second transmission ratio.

7. An exhaust gas turbocharger, comprising:

a waste gate;

an adjusting device for adjusting the waste gate, the adjusting device having a transmission system, with a three-part linkage mechanism having a driver arm that is operatively connected to a drive by a transmission, an output arm and a coupler, which operatively connects the driver arm and the output arm, the transmission having a driving gear, assigned to the drive, and a driven gear, which is assigned to the driver arm and interacts with the driving gear;

wherein the driving gear has a rolling curve radius, which changes over the circumference;

wherein the driven gear has a rolling curve radius that runs complementary to the former;

wherein the rolling curve radii are selected in an angle of rotation range about the extended position of the three-part linkage mechanism to form at least in a first region a first transmission ratio and outside the angle of rotation range to form at least in a second region one second transmission ratio that is larger than the first transmission ratio;

wherein the driver arm is connected in a rotationally rigid manner to the driven gear and is mounted with the driven gear in a common bearing, and wherein a third transmission ratio is provided outside the angle of rotation range in a third region such that the second region is situated between the first region and the third region, the third transmission ratio being smaller than the second transmission ratio.

8. The exhaust gas turbocharger of claim 7, wherein the drive is provided at a compressor housing of the exhaust gas turbocharger, and wherein the waste gate is provided at a turbine housing of the exhaust gas turbocharger.

* * * * *